United States Patent
Murayama et al.

[11] 3,886,115
[45] May 27, 1975

[54] STABILIZATION OF SYNTHETIC POLYMERS

[75] Inventors: Keisuke Murayama; Syoji Morimura; Takao Yoshioka; Hideo Horiuchi; Katsuaki Matsui; Tomoyuki Kurumada; Noriyuki Ohta; Hisayou Ohsawa, all of Tokyo, Japan

[73] Assignee: Sankyo Company Limited, Japan

[22] Filed: May 29, 1974

[21] Appl. No.: 474,189

Related U.S. Application Data

[63] Continuation-in-part of Ser. No. 308,122, Nov. 20, 1972, abandoned.

[30] Foreign Application Priority Data

Nov. 24, 1971 Japan.............................. 46-94278

[52] U.S. Cl. ................. 260/45.9 R; 260/45.85 A; 260/45.85 N; 260/45.75 W; 260/45.75 K; 260/45.9 NC
[51] Int. Cl. ....................... C08f 45/60; C08g 51/60
[58] Field of Search. 260/45.9 R, 45.85 A, 45.85 N, 260/45.75 K, 45.75 W, 45.9 NC

[56] References Cited
UNITED STATES PATENTS

| | | | |
|---|---|---|---|
| 2,111,307 | 3/1938 | Bartram | 260/45.9 |
| 2,166,955 | 7/1939 | Kirkpatrick | 260/45.9 |
| 2,384,141 | 9/1945 | Soday | 260/45.9 |
| 2,829,121 | 4/1958 | Leeper | 260/45.9 |
| 2,830,033 | 4/1958 | Beaver | 260/45.9 |
| 3,207,789 | 9/1965 | Matthews | 260/45.9 |
| 3,387,019 | 6/1968 | Gaydasch | 260/45.9 |

*Primary Examiner*—V. P. Hoke
*Attorney, Agent, or Firm*—Toren, McGeady and Stanger

[57] ABSTRACT

Synthetic polymer compositions stabilized against photo- and thermal-deteriorations wherein there is incorporated, in a sufficient amount to prevent such deteriorations, at least one of the secondary amine derivatives having the formula

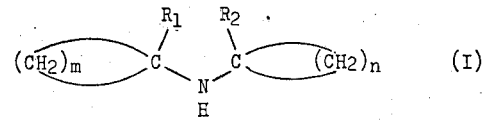

(I)

wherein $R_1$ and $R_2$ may be the same or different and each represents a group capable of being derived from carboxylic acid and m and n individually are an integer of 4 or 5 and the metal salts thereof, said secondary amine derivatives being known per se.

5 Claims, No Drawings

STABILIZATION OF SYNTHETIC POLYMERS

CROSS-REFERENCE TO PRIOR APPLICATION

This is a Continuation-in-part application of Ser. No. 308,122 filed on Nov. 20, 1972 now abandoned.

SUMMARY OF THE INVENTION

This invention relates to stabilization of synthetic polymers.

More particularly, this invention is concerned with stabilization of synthetic polymers against photo- and thermal-deteriorations thereof by having incorporated therein, in a sufficient amount to prevent such deteriorations, at least one of the secondary amine derivatives having the formula

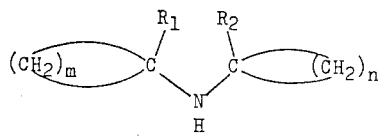

wherein $R_1$ and $R_2$ may be the same or different and each represents a group capable of being derived from a carboxylic acid and $m$ and $n$ individually mean an integer of 4 or 5 and the metal salts thereof.

The term "synthetic polymer" as used herein is intended to embrace polyolefins including homopolymers of olefins such as low-density and high-density polyethylene, polypropylene, polystyrene and the like, and copolymers of olefins with other ethylenically unsaturated monomers, such as ethylene-propylene copolymer, ethylene-butane copolymer, ethylene-vinyl acetate copolymer, styrene-butadiene copolymer, acrylonitrile-styrene-butadiene copolymer and the like; polyvinyl chlorides and polyvinylidene chlorides including homopolymer of each of vinyl chloride and vinylidene chloride, vinyl chloridevinylidene chloride copolymer and copolymers of each of vinyl chloride and vinylidene chloride with vinyl acetate or other ethylenically unsaturated monomers; polyacetals such as polyoxymethylene and polyoxyethylene; polyesters such as polyethylene terephthalate; polyamides such as 6-nylon, 6,6-nylon and 6,10-nylon; and polyurethanes.

In the above formula (I), the definition "a group capable of being derived from a carboxylic acid" as used means to include carboxyl group; a group of the formula —COOM in which M is a monovalent metal atom, e.g., sodium and potassium; a divalent metal atom, e.g., calcium, magnesium and zinc, a trivalent metal atom, e.g., aluminum and boron and a tetravalent metal atom, e.g., tin (IV); cyano group; carbamoyl group; an N-alkyl-substituted carbamoyl group, e.g., N-methylcarbamoyl, N-ethylcarbamoyl, N-propylcarbamoyl, N-butylcarbamoyl, N,N-dimethylcarbamoyl, N,N-dipropylcarbamoyl and N-ethyl-N-butylcarbamoyl; an alkoxycarbonyl group having 1 to 8 carbon atoms in the alkoxy moiety, e.g., methoxycarbonyl, ethoxycarbonyl, butoxycarbonyl and octoxycarbonyl; an aryloxycarbonyl group having 6 to 10 carbon atoms in the aryloxy moiety, e.g., phenoxycarbonyl, p-tolyloxycarbonyl and naphthoxycarbonyl and the like.

It will be appreciated by those skilled in this art that the nature of the defined $R_1$ and $R_2$ groups does not affect the unity of the inventive concept, since all the enumerated $R_1$ and $R_2$ groups are closely related.

Synthetic polymers have been widely utilized in the art, in view of their excellent properties, in various forms or shapes, for example, filament, fibre, yarn, film, sheet, other molded article, latex and foam. However, these polymers have some drawbacks such as poor light- and heat-stabilities and the like. Stated illustratively, polyolefins and polyurethane elastomers frequently tend to undergo severe deterioration when exposed to light such as sunlight or ultraviolet ray, and polyvinyl chloride and polyvinylidene chloride frequently tend to deteriorate and become colored by the action of light and heat together with elimination of hydrogen chloride therefrom. Polyamides are also frequently subjected to photo-deterioration. For the purpose of stabilizing these synthetic polymers against such deterioration, there have heretofore been proposed in the art a number of stabilizers; for example, for polyolefins, benzotriazole compounds and benzophenone compounds; for polyurethanes, phenol compounds and benzophenone compounds; and for polyvinyl chloride and polyvinylidine chloride, lead salts such as basic lead silicate and tribasic lead maleate, and organotin compounds such as dibutyltin laurate and dibutyltin maleate.

Although such prior stabilizers are known to be considerably satisfactory, there still remained some problems to be improved.

Thus, numerous attempts have been made in the art to find and develop new and more effective stabilizers.

As a result of our extensive studies, it has now been found that the secondary amine derivatives (I) of this invention exhibit a high stabilizing effect against photo- and thermal-deterioration of the synthetic polymers.

It is, accordingly, a principal object of this invention to provide a synthetic polymer composition stabilized against photo- and thermal-deteriorations thereof by having incorporated therein, in a sufficient amount to prevent such deteriorations, at least one of the secondary amine derivatives (I) and metal salts thereof.

Other objects of this invention will become apparent to those skilled in the art from the following description.

The secondary amine derivatives (I) which may be employed in this invention are all known substances and they are described and prepared according to the teachings of the Journal of Organic Chemistry, 28, 3576, (1963); the Bulletin of the Chemical Society of Japan, 36, 34 (1963); and the Recueil des Travaux Chimiques, 87, 945, (1968).

The metal salts of the secondary amine derivatives (I) may be readily prepared from the corresponding amine having one or two carboxyl groups according to known technique and the metal atom forming said salt may include any of those metals belonging to Groups I, II, III and IV of Periodic Table, e.g., calcium, magnesium, zinc, aluminum, boron and tin (IV), preferably calcium.

Of the secondary amine derivatives (I), particularly useful are the secondary amine derivatives having the formula

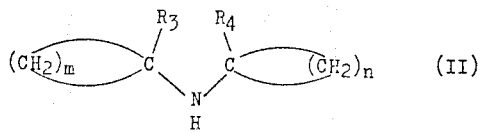

wherein $R_3$ and $R_4$ may be the same or different and each is cyano group, carboxyl group, carbamoyl group or an alkoxycarbonyl group having 1 to 8 carbon atoms in the alkoxy moiety and m and n are as defined above.

Representative of the secondary amine derivatives (I) which may be employed in this invention are as follows:

| Compound No. | Chemical Name | Physical Property |
| --- | --- | --- |
| 1. | 1,1'-dicyanodicyclohexylamine | m.p. 138°C. |
| 2. | dicyclohexylamine - 1,1'-dicarboxylic acid | m.p. 134°C. |
| 3. | 1,1'-bismethoxycarbonyl-dicyclohexylamine | m.p. 47.5 – 48.5°C. |
| 4. | 1,1'-bis-tert.butoxycarbonyl-dicyclohexylamine | m.p. 46.5 – 47.5°C. |
| 5. | 1-carbamoyldicyclohexylamine-1'-carboxylic acid | decomposition point 204°C. |
| 6. | 1,1'-dicyanodicyclopentylamine | m.p. 52 – 53°C. |
| 7. | dicyclopentylamine - 1,1'-dicarboxylic acid | m.p. > 200°C. |
| 8. | 1-carbamoyldicyclopentylamine-1'-carboxylic acid | decomposition point 190 – 191°C. |

For the most preferable and practical purposes, the compounds having the above Chemical Nos. 1, 3, 4 and 6 may be listed. Representative metal salts may include calcium or tin (IV) dicyclohexylamine-1, 1'-dicarboxylate and calcium or tin (IV) 1-carbamoyldicyclohexylamine-1'-carboxylate.

According to this invention, the secondary amine derivatives (I) employed as a stabilizer in the present invention may be readily incorporated into the synthetic polymers by any of the various standard procedures commonly utilized in the art. The stabilizer may be incorporated into the synthetic polymers at any desired stage prior to the manufacture of shaped articles therefrom. Thus, for example, the stabilizer in the form of a dry powder may be admixed with the synthetic polymer, or a suspension or emulsion of the stabilizer may be admixed with a solution, suspension or emulsion of the synthetic polymer.

The amount of the secondary amine derivatives (I) employed in the synthetic polymer in accordance with the present invention may be varied widely, depending upon the types, properties and particular uses of the synthetic polymer to be stabilized. In general, the secondary amine derivatives of the formula (I) may be added in an amount ranging from 0.01 to 5.0% by weight, based on the amount of the synthetic polymer, but the practical range is varied depending upon the type of the synthetic polymer, that is 0.01 to 2.0% by weight, preferably 0.02 to 1.0% by weight for polyolefins, 0.01 to 1.0% by weight, preferably 0.02 to 0.5% by weight for polyvinyl chloride and polyvinylidene chloride, and 0.01 to 5.0% by weight, preferably 0.02 to 2.0% by weight for polyurethanes and polyamides.

The present stabilizer may be used alone or in combination with other known additives such as antioxidants, ultraviolet absorbers, fillers, pigments and the like. Examples of the antioxidants include the phenol type compounds, e.g., 2,6-di-tert.-butyl-p-cresol, 4,4'-thiobis(6-tert.-butyl-3-methylphenol), 2,2'-thiobis(6-tert.-butyl-4-methylphenol), 4,4'-bis(2,6-di-tert.-butyl tert.-butyl-4-methylphenol), 4,4'-bis(2,6-diisopropyl phenol), 2,4,6-triisopropyl phenol, 4,4'-butylidene bis-(6-tert.-butyl-3-methylphenol), 1,1,3-tris(5-tert.-butyl-4-hydroxy-2-methylphenyl)butane, tetrakis[β-3,5-di-tert.-butyl-4-hydroxyphenyl) propionyloxymethyl] methane, 2,4,6-tris(3,5-di-tert.-butyl-4-hydroxy benzyl)mesitylene; the thiodipropionate type compounds, e.g., dilauryl thiodipropionate; and the alkyl, aryl- or alkaryl-phosphites, e.g., triphenyl phosphite, tris(p-nonyl)phenyl phosphite, diphenyl decyl phosphite. Examples of the ultraviolet absorbers include the benzotriazole type compounds, e.g., 2-(2'hydroxy-5'-methylphenyl) benzotriazole, 2-(3',5'-di-tert.-butyl-2'-hydroxyphenyl)-5-chlorobenzotriazole; the salicylate type compounds, e.g., 4-tert.-butylphenyl salicylate; the benzophenone type compounds, e.g., 2-hydroxy-4-octoxybenzophenone; and 2', 4'-di-tert.-butylphenyl-3,5-di-tert.-butyl-4-hydroxybenzoate, methyl α-cyano-β-methyl-β-(p-methoxyphenyl) acrylate and [2,2'-thiobis(4-tert.-octylphenolate)]-n-butylamine Ni(II).

If desired, two or more of the secondary amine derivatives (I) and the metal salts thereof may be satisfactorily utilized in this invention.

The following examples are given solely for the purpose of illustrating of this invention. In these examples, the number of the stabilizing compound to be used is the same as referred to above with regard to representative compound.

EXAMPLE 1

Into 100 parts of polypropylene [Noblen JHH-G, trade name, after twice recrystallizations from monochlorobenzene, available from Mitsui Toatsu Chemicals Inc., Japan] was incorporated 0.25 part of each of the stabilizing compounds of this invention as indicated below. The resulting mixture was blended and molten. The molten mixture was molded into a sheet with a thickness of 0.5 mm. under heating and pressure by a conventional technique.

As a control for comparative purpose, polypropylene sheets were formed by repeating the same procedure as described above except that no stabilizing compounds of this invention were employed.

Thereafter, all of these sheets thus prepared were tested for the "brittleness time" (which means the time, expressed in terms of hour, required until the test sheet becomes brittle) under ultraviolet irradiation at 45°C. by means of the fade-meter, "Standard Fade-Meter Type Fa-1" manufactured and sold by Toyo Rika Instruments, Inc., Japan. Such an instrument is a modification of Atlas Fade-O-meter Type FDA-R (Atlas Electric Devices Co., U.S.A.) and meets the requirements prescribed in the item 3.8 of Japanese Industrial Standard "1044-L".

The results are set forth in the following Table I.

TABLE 1

| Stabilizer added No. | Brittleness time (hours) |
|---|---|
| 1 | 460 |
| 3 | 380 |
| 6 | 340 |
| None | 100 |

EXAMPLE 2

Into 100 parts of high-density polyethylene [Hi-Zex, trade name, available from Mitsui Toatsu Chemicals Inc., Japan, employed after twice recrystallizations from toluol] were incorporated 0.1 part of each of the test compounds of this invention indicated below. The resulting mixture was made into a sheet by the same procedure as in the above Example 1.

The sheet thus formed was tested for the brittleness time by the same test method as in the above Example 1. The results are given in the following Table 2.

TABLE 2

| Stabilizer added No. | Brittleness time (hours) |
|---|---|
| 1 | 860 |
| 3 | 680 |
| 6 | 620 |
| None | 400 |

EXAMPLE 3

Into 100 parts of 6-nylon [CM 1011, trade name, available from Toray Industries Inc., Japan] was incorporated 0.25 part of each of the stabilizing compounds of this invention as indicated below. The resulting mixture was heated and melted and then molded into a film having a thickness of about 0.1 mm. under pressure by a conventional compression molding machine. The film thus formed was aged under the following aging condition and thereafter subjected to a tensile test to determine the retentions of tensile strength and elongation by a standard method.

Aging test

1. Exposure to ultraviolet ray for 300 hours in the fade meter described in the above Example 1 at 45°C.
2. Aging at 160°C. for 2 hours in the Geer's aging tester prescribed in Japanese Industrial Standard JIS-K-6301 entitled "Physical Testing Methods for Vulcanized Rubber," Paragraph 6.5.

The results are given in the following Table 3.

Table 3

| Stabilizer added No. | Fade meter, 300 hours | | Geer's aging tester, 160°C. 2 hours | |
|---|---|---|---|---|
| | Retention of ultimate elongation (%) | Retention of ultimate tensile strength (%) | Retention of ultimate elongation (%) | Retention of ultimate tensile strength (%) |
| 1 | 70 | 46 | 54 | 72 |
| 3 | 61 | 55 | 59 | 68 |
| 6 | 64 | 57 | 60 | 69 |
| None | 16 | 34 | 5 | 51 |

EXAMPLE 4

Into 100 parts of polyurethane prepared from polycaprolactone [E-5080, trade name, available from The Nippon Elastollan Industries Ltd., Japan] was incorporated 0.5 part of each of the stabilizing compounds of this invention indicated below. The resulting mixture was heated and melted and then molded into a sheet having a thickness of about 0.5 mm. The sheet thus formed was subjected to the exposure to ultraviolet ray in the fade meter as specified in the above Example 3 at 45°C. for 15 hours and then tested for the retentions of ultimate elongation and ultimate tensile strength as in the above Example 3.

The results are given in the following Table 4.

Table 4

| Stabilizer added No. | Retention of ultimate elongation (%) | Retention of ultimate tensile strength (%) |
|---|---|---|
| 1 | 88 | 90 |
| 3 | 86 | 88 |
| 6 | 94 | 86 |
| None | 72 | 49 |

EXAMPLE 5

Into 100 parts of polyvinyl chloride [Geon 103EP, trade name, available from The Japanese Geon Co., Ltd., Japan] were incorporated 40 parts of dioctyl phthalate and 0.1 part of each of the stabilizing compounds of this invention as indicated below. The resulting mixture was kneaded for 5 minutes on a kneading roll at 140°C. and formed into a sheet with a thickness of 1 mm.

The sheet thus formed was aged under the following aging condition to observe the discoloration of the sheet.

Aging test

1. Exposure for 200 hours to the fade meter as described in the above Example 1.
2. Aging at 160°C. for 30 minutes in the Geer's aging tester as described in the above Example 1.

The results are given in the following Table 5.

Table 5

| Stabilizer added | Discoloration | |
|---|---|---|
| | Fade meter | Geer's aging tester |
| Ca salt of No.2 | pale yellow | pale yellow |
| Tin (IV) salt of No.2 | " | " |
| None | dark brown | brown |

It will become apparent from the above results that the secondary amine derivatives (I) are effective in stabilization of various synthetic polymers against their deteriorations.

What is claimed is:

1. A synthetic polymer composition of a polymer selected from the group consisting of polyethylene, polypropylene, polyamide, polyurethane and polyvinyl chloride stabilized against photo- and thermal deterioration, wherein there is incorporated, in an amount sufficient to prevent said deterioration, at least one secondary amine having the formula

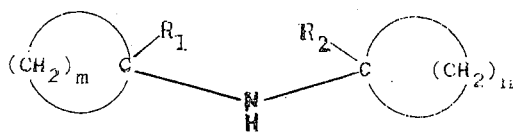

wherein
R₁ and R₂ may be the same or are different and represent —CN, —COOH, —COOM with M being a metal having from 1 to 4 valences, carbamoyl, N-alkyl-substituted carbamoyl where the alkyl substituents have up to 6 carbon atoms, alkoxycarbonyl having from 1 to 8 carbon atoms in the alkoxy moiety, or aryloxycarbonyl having from 6 to 10 carbon atoms in the aryloxy moiety, and
m and n individually are an integer of 4 to 5.

2. A synthetic polymer composition as claimed in claim 1, wherein each of R₁ and R₂ is —CN, —COOH, carbamoyl or alkoxycarbonyl having from 1 to 8 carbon atoms in the alkoxy moiety.

3. A synthetic polymer composition as claimed in claim 1, wherein each of R₁ and R₂ is —COOM with M being calcium, magnesium, zinc, alumnium, boron or tin (IV).

4. A synthetic polymer composition as claimed in claim 1, wherein said secondary amine is incorporated in an amount of 0.01 to 5.0 % by weight, based upon the amount of said synthetic polymer.

5. A synthetic polymer composition of a polymer selected from the group consisting of polyethylene, polypropylene, polyamide, polyurethane and polyvinyl chloride stabilized against photo- and thermal deterioration, wherein there is incorporated 1,1'-dicyanodicyclohexylamine or 1,1'-dicyanodicyclopentylamine in an amount sufficient to prevent said deterioration.

* * * * *